Oct. 28, 1924.
A. B. CORNELIUS ET AL
AUTOMOBILE
Filed March 8, 1923
1,513,227
3 Sheets—Sheet 3
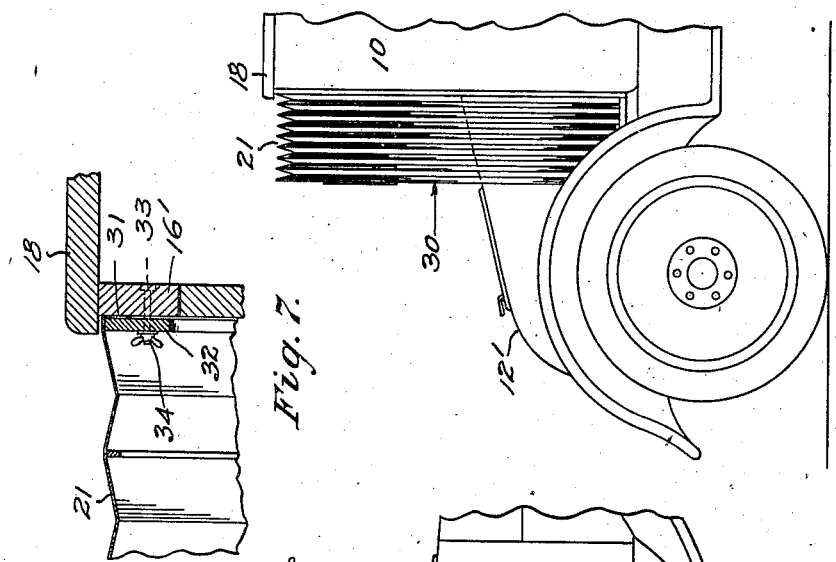
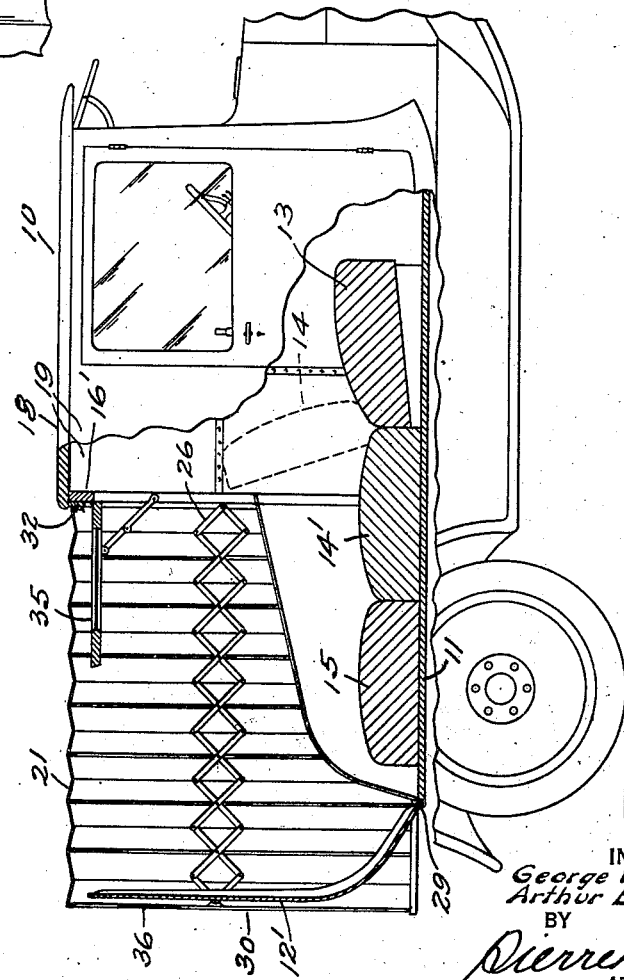
INVENTORS:
George W. Young
Arthur B. Cornelius
BY
Pierre Barnes
ATTORNEY Patented Oct. 28, 1924.

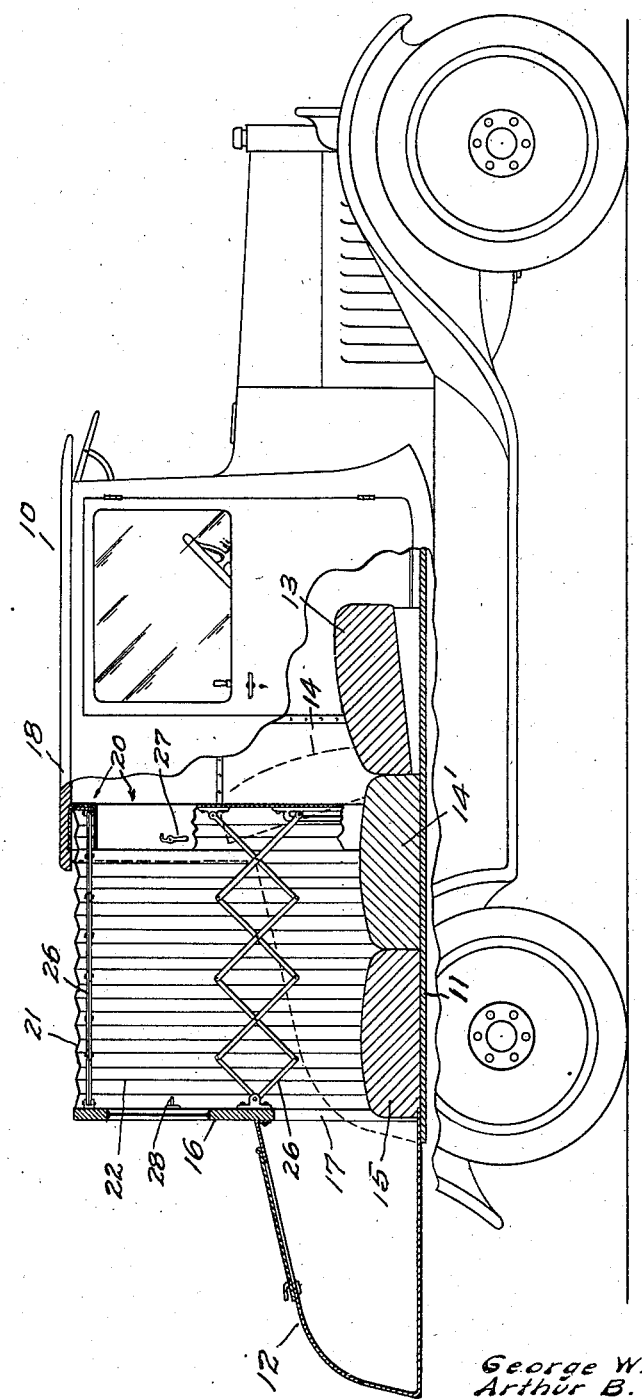

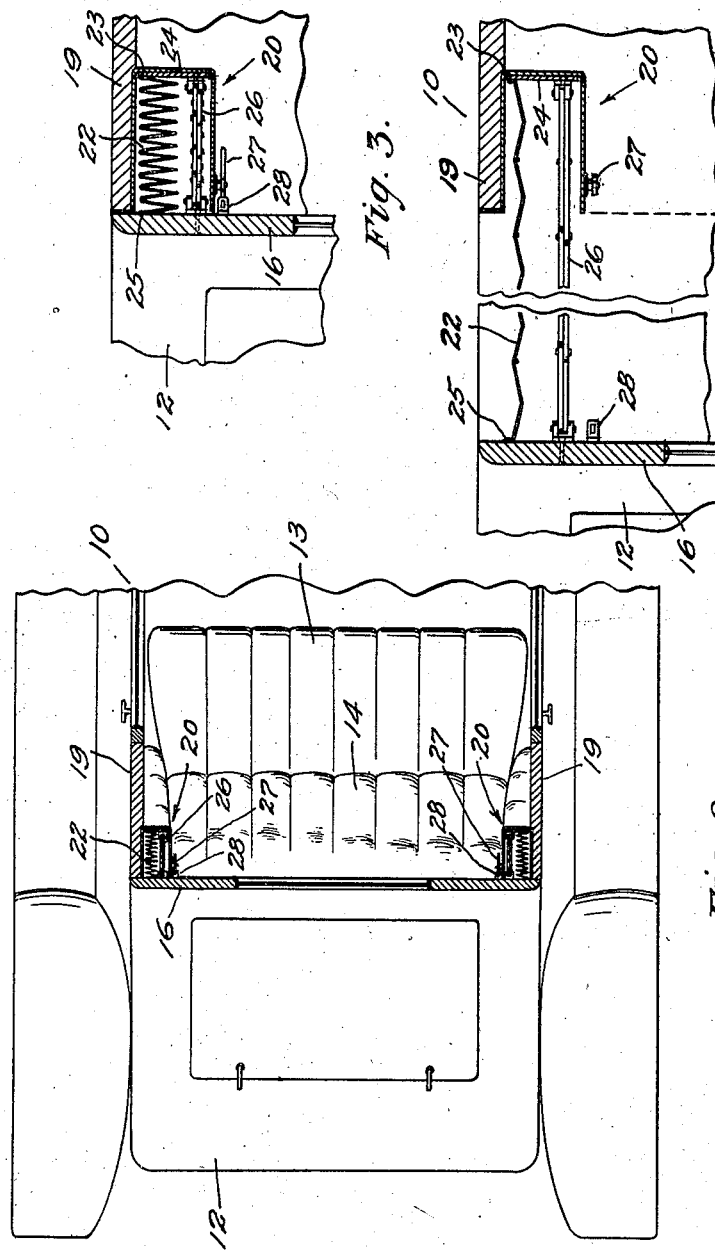

1,513,227

UNITED STATES PATENT OFFICE.

ARTHUR B. CORNELIUS AND GEORGE W. YOUNG, OF SEATTLE, WASHINGTON.

AUTOMOBILE.

Application filed March 8, 1923. Serial No. 623,666.

*To all whom it may concern:*

Be it known that we, ARTHUR B. CORNELIUS and GEORGE W. YOUNG, citizens of the United States, residing at Seattle, in the county of King and State of Washington, have invented certain new and useful Improvements in Automobiles, of which the following is a specification.

This invention relates to automobiles of the closed body type.

The invention has for an object, to provide an automobile of this character having a body extension which, upon occasion, may be utilized in cooperation with the body proper to accord a sleeping compartment.

A further object of the invention is the provision of a body extension which is conveniently extended for the purpose above mentioned, or when not thus employed, it can be contracted and housed so as to be concealed.

Other objects and advantages of the invention will appear in the following description.

The invention consists in the novel construction, adaptation and combination of parts hereinafter described and claimed.

In the accompanying drawings, in which similar parts are denoted by corresponding reference numerals,—

Figure 1 is a view, partly in side elevation and partly in longitudinal vertical section, of an automobile embodying our invention in its form now preferred by us, the body extension being illustrated in its extended position and with the cushions arranged to provide a bed. Fig. 2 is a horizontal sectional view of a portion of the devices shown in Fig. 1, the body extension being illustrated in its contracted position. Fig. 3 is a fragmentary horizontal section of Fig. 2 to a larger scale. Fig. 4 is a view similar to Fig. 3, illustrating the parts in relatively extended positions. Fig. 5 is a view similar to Fig. 1 illustrating a modified form of the extension applied to a slightly different construction of automobile body, said extension being illustrated in its extended position. Fig. 6 is a side elevation of Fig. 5 with the body extension in its contracted position. Fig. 7 is a fragmentary vertical section of Fig. 5 to a larger scale.

In said drawings, and referring to Figs. 1 to 4, inclusive, the numeral 10 indicates, generally, the body of an automobile of the closed type having a floor 11 which, as shown, extends rearwardly to serve as a support for the hamper structure 12.

Within said tonneau is the usual seat having a seat cushion 13, but the back rest 14 including its cushion is arranged to be removable from its normal position in which it is indicated by dotted lines in Fig. 1 and by full lines in Fig. 2. According to our invention, the cushion 14 is designed not only for use as a back-rest; but when positioned as at 14¹ in Fig. 1, upon the floor 11 to the rear of the tonneau to serve for a mattress section in cooperation with the seat-cushion 13 and a supplementary cushion 15.

The tonneau rear wall 16 is secured to the hamper wall and in front of the hamper compartment the wall 16 is provided with an opening 17 to afford communication between such compartment and the interior of the tonneau. Said hamper is mounted upon the floor 11 for movements with the wall 16 longitudinally of the vehicle.

Secured to the roof 18 and side walls 19 of the tonneau and interiorly of the latter, are members 20 of a casing which serves as a receptacle to receive the roof and side walls 21 and 22, respectively, of the rear extension to the tonneau. Said extension walls are formed of canvas, or other suitable material, arranged with bellows-like folds to render the same distendable.

The front edges of said extension walls are secured as at 23 (Figs. 3 and 4) to the front walls 24 of the respective casing members and their rear edges are secured as at 25 to the movable tonneau rear wall 16. Said rear wall is also adjustably connected with the casing walls 24 by means of extensible braces such as lazy tongs 26, for example.

Suitable fastening devices such as hook latches 27 are connected to said casing and engageable in attachments 28 of the wall 16 to serve to releasably secure the latter in its closed relations with respect to the tonneau.

The extension is elongated by pulling the hamper 12 rearwardly into its Figs. 1 and 4 position. To contract the extension said hamper is pushed forwardly thereby causing the extension walls 21 and 22 to fold and accompany the braces 26 into the respective casing members 20, as shown in Figs. 2 and 3.

When the extension is thus contracted the rear wall 16 of the tonneau is brought against the top and side walls of the latter and is secured thereagainst by the fastening means 27—28.

When in its contracted condition the extension top and side walls are housed out of sight in the casing which does not detract from the appearance of the interior of the tonneau.

The outside appearance of the tonneau differs in no respect from standard constructions as the rear wall makes a close fit to the adjacent portions of the top and side walls 18 and 19.

In the modified form of the invention illustrated in Figs. 5 to 7, inclusive, the rear wall 16¹ of the tonneau is rigid with the associated roof 18 and the side walls 19 of the tonneau. The hood member 12¹ of the hamper is hingedly connected as at 29 to the rear end of the floor 11 to enable the hood to be raised into its Fig. 5 position and in proximity to a back wall 30 of the extension when the latter is in its extended position.

With a relatively stationary rear wall 16¹ the front edges of the extension walls are secured as at 31 to a frame 32 which is detachably secured to the wall 16¹ as by means of screw bolts and nuts such as 33 and 34, respectively, in Fig. 7.

With a back wall 30, the same is provided with a sight opening 36 through which the occupants of the car may look through when driving.

35 represents a section of the rear wall 16¹, the same advantageously being arranged to swing upwardly to occupy the position in which it is shown in Fig. 5, for the purpose of affording a passage between the interiors of the tonneau and the extension.

The construction illustrated in Figs. 5–7 is adjustable accordion-like and may readily be brought from either of such illustrated positions to the other.

What we claim, is,—

1. In an automobile, a body having a front section provided with a roof and side-wall elements, and a rear wall arranged for relative longitudinal movements, extensible roof and wall elements adapted to close the opening between said sections when the body is to be used in its extended position, and casing members provided on the roof and wall elements of said front section to respectively house said extensible roof and wall elements when in their contracted positions.

2. In an automobile, a body having a front section having roof and wall elements and a rear section arranged for horizontal movements relative to said front section, a member comprising expansible roof and wall elements connecting said body sections, channel shaped receptacles mounted on the roof and wall elements of one of said sections for containing and concealing said member when in its contracted position, and means for releasably securing said sections to each other.

3. In an automobile, the combination with the body having a hamper member at the rear thereof, said body being unprovided with a wall between the tonneau compartment and the hamper compartment, and expansible roof and side walls connected to said body and affording an extension to the tonneau compartment.

4. In an automobile, the combination with the body having a hamper member at the rear thereof, said body being unprovided with a wall between the tonneau compartment and the hamper compartment, a seat in the tonneau compartment, said seat having a detachable back-rest which is adapted to serve as a removable closure for the opening between said compartments, and expansible roof and side walls connected to said body and affording an extension to the tonneau compartment.

5. In an automobile, a body having front and rear sections, a member comprising extensible roof and side wall elements serving as a connection between said body sections, extensible braces connected to said body sections for supporting said member, in its extended position means for releasably securing said member in its contracted position with respect to said front section, and means provided interiorly of the body for concealing said member when in its contracted position.

ARTHUR B. CORNELIUS.
GEORGE W. YOUNG.